United States Patent
Mori

(10) Patent No.: US 9,875,766 B2
(45) Date of Patent: Jan. 23, 2018

(54) MAGNETIC TAPE AND MAGNETIC SIGNAL REPRODUCING DEVICE

(71) Applicant: FUJIFILM Corporation, Tokyo (JP)

(72) Inventor: Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/141,168

(22) Filed: Apr. 28, 2016

(65) Prior Publication Data

US 2016/0322076 A1 Nov. 3, 2016

(30) Foreign Application Priority Data

Apr. 30, 2015 (JP) ................................. 2015-093606

(51) Int. Cl.
*G11B 5/735* (2006.01)
*G11B 5/71* (2006.01)
*G11B 5/78* (2006.01)

(52) U.S. Cl.
CPC ................ *G11B 5/735* (2013.01); *G11B 5/71* (2013.01); *G11B 5/78* (2013.01)

(58) Field of Classification Search
None
See application file for complete search history.

(56) References Cited

U.S. PATENT DOCUMENTS

| 2002/0028352 A1* | 3/2002 | Kato | G11B 5/714 |
| | | | 428/840.2 |
| 2005/0106421 A1* | 5/2005 | Kurose | G11B 5/70 |
| | | | 428/842.8 |
| 2008/0145710 A1* | 6/2008 | Kuwajima | G11B 5/70 |
| | | | 428/831 |
| 2009/0086369 A1* | 4/2009 | Ishida | G11B 5/70 |
| | | | 360/110 |

FOREIGN PATENT DOCUMENTS

| JP | 2004-273070 A | 9/2004 |
| JP | 2006-031805 A | 2/2006 |

\* cited by examiner

*Primary Examiner* — Kevin M Bernatz
(74) *Attorney, Agent, or Firm* — Sughrue Mion, PLLC

(57) ABSTRACT

The magnetic tape has a nonmagnetic layer, a magnetic layer, and a backcoat layer; with one or both of the magnetic layer and nonmagnetic layer comprising at least one type of lubricant; with the backcoat layer comprising at least one type of lubricant; with a surface lubricant index as measured on a surface of the magnetic layer ranging from 1.00 to 4.00; and
  with a state of a presence of indentations on the surface of the magnetic layer satisfying condition 1 and condition 2:
  condition 1: a number of indentations greater than or equal to 5 nm and less than 10 nm in depth of 5 to 1,000 per 350 µm×260 µm area; and
  condition 2: a number of indentations greater than or equal to 10 nm in depth of less than or equal to 100 per 350 µm×260 µm area.

19 Claims, No Drawings

MAGNETIC TAPE AND MAGNETIC SIGNAL REPRODUCING DEVICE

CROSS-REFERENCE TO RELATED APPLICATIONS

This application claims priority under 35 U.S.C 119 to Japanese Patent Application No. 2015-93606 filed on Apr. 30, 2015. The above application is hereby expressly incorporated by reference, in its entirety.

BACKGROUND OF THE INVENTION

Field of the Invention

The present invention relates to a magnetic tape and a magnetic signal reproducing device.

Discussion of the Background

Magnetic recording media include tape-shaped media and disk-shaped media. Magnetic recording media in the form of tapes, that is, magnetic tapes, are primarily employed in storage applications such as data-backup tapes. A signal is normally recorded on and reproduced from a magnetic tape by running the magnetic tape in a drive to bring the surface of the magnetic layer into contact with (cause it to slide over) a magnetic head (also referred to hereinafter simply as a "head"). However, with repeated running in a state of a high coefficient of friction during sliding of the surface of the magnetic layer over the head, the surface of the magnetic layer ends up being shaved, producing shavings. Such shavings may cause fluctuation in output (spacing loss), and with repeated running, compromise electromagnetic characteristics. Accordingly, it is desirable to increase the running durability of the magnetic tape (inhibit shaving of the surface of the magnetic layer with repeated running) to inhibit the drop in electromagnetic characteristics due to repeated running.

Conventional means of lowering the coefficient of friction include incorporating a lubricant into a magnetic layer provided on a nonmagnetic support or into a nonmagnetic layer provided between the magnetic layer and the nonmagnetic support (see Japanese Unexamined Patent Publication (KOKAI) No. 2004-273070, which is expressly incorporated herein by reference in its entirety) and incorporating a lubricant into a backcoat layer positioned on the opposite side of the nonmagnetic support from the magnetic layer (see Japanese Unexamined Patent Publication (KOKAI) No. 2006-31805, which is expressly incorporated herein by reference in its entirety).

As regards electromagnetic characteristics, Japanese Unexamined Patent Publication (KOKAI) No. 2004-273070 states that the signal-to-noise ratio (SNR) decreases when the distribution of indentations greater than or equal to 20 nm in depth on the surface of the magnetic layer exceeds 30/(175 μm×130 μm) (see Japanese Unexamined Patent Publication (KOKAI) No. 2004-273070, paragraph 0112).

SUMMARY OF THE INVENTION

As has been the conventional practice, it is possible to incorporate a lubricant into the surface of the magnetic layer that slides against the head during running by incorporating a lubricant into each of the above layers. More specifically, by causing a lubricant that has been incorporated into the magnetic layer and/or the nonmagnetic layer to seep out (migrate) onto the surface of the magnetic layer, or by bringing the surface of the backcoat layer into contact with the surface of the magnetic layer when rolled up on a reel within a magnetic tape cartridge and providing (transferring) a lubricant to the surface of the magnetic layer from the surface of the backcoat layer, it is possible to impart lubricant to the surface of the magnetic layer. In this regard, a surface lubricant index is adopted as an indicator of the quantity of lubricant that is present on the surface of the magnetic layer in Japanese Unexamined Patent Publication (KOKAI) No. 2004-273070. However, based on research conducted by the present inventor, it is difficult to enhance both running durability and electromagnetic characteristics in the magnetic tapes employed in magnetic recording and reproduction systems that have been designed to achieve higher recording densities in recent years by controlling the distribution of indentations on the surface of the magnetic layer and controlling the surface lubricant index as set forth in Japanese Unexamined Patent Publication (KOKAI) No. 2004-273070.

An aspect of the present invention provides for a magnetic tape affording both good electromagnetic characteristics and good running durability.

The present inventor conducted extensive research, and as a result, discovered the following magnetic tape according to an aspect of the present invention.

A magnetic tape having a nonmagnetic layer containing nonmagnetic powder and binder on one surface of a nonmagnetic support;

having a magnetic layer containing ferromagnetic powder and binder on the surface of a nonmagnetic layer;

having a backcoat layer containing nonmagnetic powder and binder on the opposite surface of the nonmagnetic support from the surface on which the nonmagnetic layer and magnetic layer are present;

with one or both of the magnetic layer and nonmagnetic layer containing at least one type of lubricant;

with the backcoat layer containing at least one type of lubricant;

with the surface lubricant index as measured on the surface of the magnetic layer falling within a range of 1.00 to 4.00; and with the state of the presence of indentations on the surface of the magnetic layer satisfying condition 1 and condition 2:

condition 1: a number of indentations greater than or equal to 5 nm and less than 10 nm in depth of 5 to 1,000 per 350 μm×260 μm area; and condition 2: a number of indentations greater than or equal to 10 nm in depth of less than or equal to 100 per 350 μm×260 μm area.

The above magnetic tape can afford both good electromagnetic characteristics and good running durability. The present inventor presumes this to be due to the following.

A surface lubricant index as measured on the surface of the magnetic layer that falls within a range of 1.00 to 4.00 can impart good electromagnetic characteristics to the magnetic tape. However, when the amount of lubricant that is present on the surface of the magnetic layer decreases due to contact between the surface of the magnetic layer and the head with repeated running, shaving of the surface of the magnetic layer tends to occur due to contact with the head. Accordingly, as described in Japanese Unexamined Patent Publication (KOKAI) No. 2006-31805, it is conceivable to incorporate lubricant into the backcoat layer to supply lubricant to the surface of the magnetic layer from the backcoat layer. In this regard, the present inventor discovered that it was possible to both enhance electromagnetic characteristics and enhance running durability by controlling the state in which indentations were present on the surface of the magnetic layer by satisfying conditions 1 and 2 in addition to incorporating a lubricant into the backcoat layer. The presumptions of the present inventor are given in greater detail below.

The present inventor assumes that having the surface of the magnetic layer satisfy conditions 1 and 2 can ensure a contact area capable of uniformly and adequately transferring lubricant to the surface of the magnetic layer from the backcoat layer.

The present inventor presumes that the indentations that are greater than or equal to 5 nm and less than 10 nm in depth as specified by condition 1 can function as suitable lubricant reservoirs for replenishing lubricant that has been depleted on the surface of the magnetic layer with repeated running.

Furthermore, the number of indentations that are greater than or equal to 10 nm in depth as specified by condition 2 is reduced because such indentations may compromise electromagnetic characteristics. In addition to this, the above number of indentations of greater than or equal to 5 nm and less than 10 nm in depth as specified by condition 1 is present on the surface of the magnetic layer. The present inventor assumes that the indentations that are specified by condition 1 can function as lubricant reservoirs as stated above without greatly impacting electromagnetic characteristics. Since the lower limit of depth at which identification as indentations is normally made by measurement is about 5 nm, the indentations that are specified by condition 1 are indentations that are greater than or equal to 5 nm (and less than 10 nm) in depth.

However, the above are mere presumptions by the present inventor and do not limit the present invention in any way.

The surface lubricant index that is measured on the surface of the magnetic layer is a value that is measured by employing a measurement sample in the form of a tape sample obtained by cutting a prescribed length from the end of a roll of magnetic tape (magnetic tape roll) that has been wound up into a roll. Unless specifically stated otherwise, the surface lubricant index that is measured on the surface of the magnetic layer is a value that is measured in a magnetic tape prior to running.

The method of measuring the surface lubricant index is as follows.

Two samples measuring 10 mm×30 mm in size are cut from a measurement sample (the above tape sample). One of the two samples that have been cut out (referred to as "Sample A" below) is not subjected to lubricant removal processing, while the other (referred to as "Sample B" below) is subjected to lubricant removal processing. The lubricant removal processing is conducted as follows.

(Lubricant Removal Processing)

The lubricant that has been adsorbed onto ferromagnetic powder is extracted and removed by immersing Sample B in an organic solvent. Subsequently, the lubricant that has been adsorbed onto the ferromagnetic powder is derivatized with a silylating agent to remove the lubricant from the ferromagnetic powder, and then extracted and removed with an organic solvent.

The lubricant can be removed from Sample B by the above process. Specific examples of the lubricant removal process are described further below in Examples.

The KLL peak intensity of carbon (C) (referred to as the "C intensity" hereinafter) and the LMM peak intensity of iron (Fe) (referred to as the "Fe intensity" hereinafter) are obtained in differential form by auger electron spectroscopy on the magnetic layer surfaces of Sample A and Sample B from which the lubricant has been removed by the process set forth above, and the intensity ratio of the C intensity to the Fe intensity (C intensity/Fe intensity) is calculated. Auger electron spectroscopy permits analysis of elements in the region (extreme outer surface) to a depth of several tens of Angstroms (several nm) from the surface of the sample being measured, making it possible to determine which elements are present on the extreme outer layer and the stoichiometric relations between them. The KLL peak of carbon (C) is an augur electron peak deriving from lubricant and binder, and the LMM peak of iron (Fe) is an augur electron peak deriving from ferromagnetic powder. Ferromagnetic powder normally contains iron (Fe) as a constituent element. However, when the quantity of iron that is contained is inadequate for an augur electron spectroscope to determine the LMM peak intensity for the ferromagnetic powder that is contained in the magnetic layer, it suffices to employ the augur electron peak of an element constituting the ferromagnetic powder other than iron instead of the LMM peak of iron (Fe).

Sample B is subjected to a lubricant removal process. Thus, the KLL peak of carbon (C) that is detected in Sample B can be viewed as an augur electron peak derived from binder. By contrast, since Sample A is not subjected to a lubricant removal process, the KLL peak of carbon (C) that is detected in Sample A is an augur peak derived from lubricant and binder. Accordingly, the intensity ratio that is calculated for Sample A can be divided by the intensity ratio calculated for Sample B to eliminate the effect of binder on the measurement value. Accordingly, in the present invention, the value that is calculated as "A/B" when the intensity ratio calculated for Sample A is denoted as A and the intensity ratio calculated for Sample B is denoted as B is adopted as the surface lubricant index measured on the surface of the magnetic layer.

An augur electron spectroscope (model PHI-660) made by Φ (Phi) Corporation of the U.S., for example, can be employed for measurement by augur electron spectroscopy. The measurement conditions can be as set forth below, by way of example. The surface lubricant indexes that are given in Examples further below are values that were calculated using values obtained by measurement under the conditions given below with the device set forth above.

| | |
|---|---|
| Primary electron beam acceleration voltage: | 3 kV |
| Sample current: | 130 mA |
| Magnification: | 250-fold |
| Incidence angle: | 30° |
| Kinetic energy: | 130 to 730 eV |
| Number of integrations: | 3 |

The number of indentations relating to conditions 1 and 2 above are determined as the arithmetic average of the number of indentations determined at 10 different measurement sites (size of each measurement site: 350 μm×260 μm) on the surface of the magnetic layer using a 3-D surface structure analyzer. The number of indentations in each measurement region can be measured by the following method, for example. The number of indentations in Examples given further below is a value determined by the following method.

Measurement is conducted at a scan length of 5 μm by scanning white light interferometry with a general-purpose 3-D surface structure analyzer in the form of a NewView 5010 made by ZYGO Corporation. The measurement viewfield is 350 μm×260 μm. The measurement results are processed with a high-pass filter (HPF): 1.65 μm, low-pass filter (LPF: 50 μm). The number of indentations greater than or equal to 5 nm and less than 10 nm in depth and the number of indentations greater than or equal to 10 nm in depth are counted.

In one embodiment, the nonmagnetic powder contained in the backcoat layer is carbon black with an average particle size of less than or equal to 50 nm.

In one embodiment, the backcoat layer further contains an amine compound.

In one embodiment, the lubricant that is contained in either one or both of the magnetic layer and nonmagnetic layer is at least one lubricant selected from the group consisting of a fatty acid, a fatty acid ester, and a fatty acid amide.

In one embodiment, the lubricant that is contained in the backcoat layer is at least one lubricant selected from the group consisting of a fatty acid, a fatty acid ester, and a fatty acid amide.

In one embodiment, the thickness of the magnetic layer falls within a range of 5 to 200 nm.

In one embodiment, the thickness of the nonmagnetic layer falls within a range of 5 nm to 3 μm.

In one embodiment, the backcoat layer contains 1.0 to 40.0 weight parts of lubricant per 100.0 weight parts of nonmagnetic powder.

In one embodiment, the ferromagnetic powder is ferromagnetic powder selected from the group consisting of ferromagnetic hexagonal ferrite powder and ferromagnetic metal powder.

A further aspect of the present invention relates to a magnetic signal reproducing device containing the above magnetic tape and a magnetic reproduction head.

In one embodiment, the magnetic signal reproducing device reproduces a magnetic signal that has been recorded at a linear recording density of greater than or equal to 200 kfci on the above magnetic tape by the above magnetic reproduction head.

An aspect of the present invention can provide a magnetic tape capable of achieving good electromagnetic characteristics and inhibiting shaving of the surface of the magnetic layer with repeated running (that is, afford good running durability). An aspect of the present invention can further provide a magnetic signal recording device equipped with such a magnetic tape.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

[Magnetic Tape]

An aspect of the present invention relates to the following magnetic tape:

A magnetic tape having a nonmagnetic layer containing nonmagnetic powder and binder on one surface of a nonmagnetic support;

having a magnetic layer containing ferromagnetic powder and binder on the surface of a nonmagnetic layer;

having a backcoat layer containing nonmagnetic powder and binder on the opposite surface of the nonmagnetic support from the surface on which the nonmagnetic layer and magnetic layer are present;

with one or both of the magnetic layer and nonmagnetic layer containing at least one type of lubricant;

with the backcoat layer containing at least one type of lubricant;

with the surface lubricant index as measured on the surface of the magnetic layer falling within a range of 1.00 to 4.00; and with the state of the presence of indentations on the surface of the magnetic layer satisfying condition 1 and condition 2:

condition 1: a number of indentations greater than or equal to 5 nm and less than 10 nm in depth of 5 to 1,000 per 350 μm×260 μm area; and condition 2: a number of indentations greater than or equal to 10 nm in depth of less than or equal to 100 per 350 μm×260 μm area.

The above magnetic tape will be described in detail below.

<Surface Lubricant Index>

The surface lubricant index that is measured on the surface of the magnetic layer of the above magnetic tape falls within a range of 1.00 to 4.00. The term "surface lubricant index" in the present invention is a value that is measured for a magnetic tape prior to running, as set forth above. A magnetic tape with a surface lubricant index falling within a range of 1.00 to 4.00 can afford good electromagnetic characteristics. From the perspective of further enhancing the electromagnetic characteristics, the surface lubricant index is preferably less than or equal to 3.50, more preferably less than or equal to 3.00, still more preferably less than or equal to 2.50, and yet still more preferably, less than or equal to 2.00. From the same perspective, the surface lubricant index is preferably greater than or equal to 1.10 and more preferably, greater than or equal to 1.20.

The surface lubricant index can be controlled by means of the types and quantities of lubricants that are added to the composition employed to form the various layers of the magnetic layer, nonmagnetic layer, and backcoat layer during manufacturing of the magnetic tape; the compositional formula; and the manufacturing conditions of the magnetic tape. Reference can be made, by way of example, to Japanese Unexamined Patent Publication (KOKAI) No. 2004-273070, paragraphs 0009 and 0010, regarding the manufacturing method.

It is also desirable for the surface lubricant index that is measured on the surface of the magnetic layer following repeated running to fall within the above range from the perspective of inhibiting shaving of the surface of the magnetic layer with repeated running. For example, it is desirable for the surface lubricant index that is measured on the surface of the magnetic layer with repeated running (after running 1,000 passes) in Examples set forth further below to fall within the range given above. As will be set forth in detail further below, controlling the presence of indentations on the surface of the magnetic layer and incorporating lubricant into the backcoat layer can yield a magnetic tape with a surface lubricant index measured on the surface of the magnetic layer following repeated running that also falls within the range set forth above.

<Presence of Indentations on the Surface of the Magnetic Tape>

The magnetic tape of an aspect of the present invention exhibits the above surface lubricant index and has indentations the presence of which on the surface of the magnetic layer satisfies conditions 1 and 2 below. The magnetic tape of an aspect of the present invention can afford good electromagnetic characteristics and good running stability. Presumptions made by the present inventor in this regard are as set forth above.

Condition 1: a number of indentations greater than or equal to 5 nm and less than 10 nm in depth of 5 to 1,000 per 350 μm×260 μm area.

Condition 2: a number of indentations greater than or equal to 10 nm in depth of less than or equal to 100 per 350 μm×260 μm area.

From the perspective of further enhancing electromagnetic characteristics and running durability, the number of indentations specified by condition 1 is desirably greater than or equal to 10, preferably greater than or equal to 20, more preferably greater than or equal to 30, still more preferably greater than or equal to 50, and yet more preferably, greater than or equal to 70. From the same perspective, this number is desirably less than or equal to 950, preferably less than or equal to 900, more preferably less than or equal to 850, still more preferably less than or equal to 800, yet more preferably less than or equal to 700, yet still more preferably less than or equal to 600, and even more preferably, less than or equal to 500.

From the same perspective, the number of indentations specified by condition 2 is desirably less than or equal to 95, preferably less than or equal to 90, more preferably less than or equal to 85, still more preferably less than or equal to 80, and yet more preferably, less than or equal to 70. For example, it can be greater than or equal to 1, greater than or equal to 5, or greater than or equal to 10. It can also be 0.

The presence of indentations on the surface of the magnetic layer can be controlled by the types and quantities of nonmagnetic powder added to the composition for forming the backcoat layer; the composition formula; the manufacturing conditions and formula of the composition for forming the magnetic layer; and the like. A detailed description is given further below.

<Lubricant>

The lubricant will be described next.

The lubricant is a component that contributes to lowering the coefficient of friction during sliding of the surface of the magnetic layer and the head. The various lubricants that are commonly employed in magnetic tapes, such as a fatty acid, a fatty acid ester, and a fatty acid amide, can be employed.

Examples of a fatty acid are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. Fatty acids can also be incorporated into the magnetic tape in the form of salts such as metal salts.

Examples of a fatty acid ester are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of a fatty acid amide are amides of various fatty acids, such as amide laurate, amide myristate, amide palmitate, and amide stearate.

The magnetic layer desirably contains a fatty acid that tends to migrate from the interior portion of the magnetic layer to the surface of the magnetic layer, preferably contains a fatty acid and one or more fatty acid derivatives, and further preferably contains a fatty acid and one or more fatty acid derivatives selected from the group consisting of a fatty acid ester and a fatty acid amide.

When the fatty acid is employed together with one or more fatty acid derivatives (esters, amides, and the like), the fatty acid derived moiety of a fatty acid derivative desirably has a structure that is identical or similar to that of the fatty acid which is employed together. As an example, when employing stearic acid as a fatty acid, it is desirable to employ a stearic acid ester and/or amide stearate.

The lubricants described in Japanese Unexamined Patent Publication (KOKAI) No. 2009-96798, which is expressly incorporated herein by reference in its entirety, can also be employed.

The lubricant can be incorporated into either the magnetic layer or the nonmagnetic layer, or both. The nonmagnetic layer can function as a tank that supplies lubricant to the magnetic layer. Lubricant is desirably contained in both the magnetic layer and the nonmagnetic layer.

The content of lubricant in the magnetic layer is, for example, 2.0 to 30.0 weight parts, desirably 4.0 to 15.0 weight parts, and preferably 6.0 to 12.0 weight parts per 100.0 weight parts of ferromagnetic powder. When two or more different lubricants are employed, the content refers to the combined content of the lubricants. Unless specifically stated otherwise, the same holds true for the contents of other components in the present invention and in the present specification.

The content of lubricant in the nonmagnetic layer is, for example, 0.5 to 10.0 weight parts, desirably 0.8 to 6.0 weight parts, and preferably 1.0 to 4.0 weight parts per 100.0 weight parts of nonmagnetic powder. Carbon black tends to adsorb less lubricant than the various nonmagnetic powders that can be employed in the nonmagnetic layer. This tendency of nonmagnetic powder to adsorb less lubricant can achieve an increased quantity of lubricant migrating from the nonmagnetic layer to the magnetic layer, and to the surface of the magnetic layer. Accordingly, one desirable way to control the surface lubricant index of the surface of the magnetic layer is to employ carbon black for part or all of the nonmagnetic powder in the nonmagnetic layer.

The greater the quantity of lubricant contained in the magnetic layer, the greater the tendency of the magnetic layer to soften and of protruding shapes present on the surface of the backcoat layer to transfer to the surface of the magnetic layer. Thus, the number of indentations specified by conditions 1 and 2 tends to increase. Accordingly, one example of a way to control the number of indentations of conditions 1 and 2 is to adjust the quantity of lubricant added to the magnetic layer.

The backcoat layer desirably contains one or more lubricants selected from the group consisting of a fatty acid, a fatty acid ester, and a fatty acid amide. The backcoat layer preferably contains a fatty acid that is a lubricant that will readily migrate from within the backcoat layer to the surface of the backcoat layer, more preferably contains a fatty acid and one or more derivatives of a fatty acid, still more preferably contains a fatty acid and one or more selected from the group consisting of a fatty acid ester and a fatty acid amide, and yet more preferably contains a fatty acid, a fatty acid ester, and a fatty acid amide. The quantity of lubricant that is contained in the backcoat layer is, for example, 0.3 to 40.0 weight parts, desirably 1.0 to 8.0 weight parts, and preferably 2.0 to 6.0 weight parts per 100.0 weight parts of nonmagnetic powder contained in the backcoat layer. The surface lubricant index that is measured in the magnetic tape prior to running can be controlled by transferring lubricant from the backcoat layer to the surface of the magnetic layer by bringing the surface of the magnetic layer and the backcoat layer into contact with the magnetic tape in a rolled up state prior to use (prior to running).

The various layers and nonmagnetic support included in the magnetic tape of an aspect of the present invention and the method of manufacturing the magnetic tape will be described in greater detail below.

<Magnetic Layer>
(Ferromagnetic Powder)

Various ferromagnetic powders that are conventionally employed in magnetic tapes can be employed as ferromagnetic powder. From the perspective of achieving higher density recording, ferromagnetic powder with an average particle size of less than or equal to 50 nm is desirable. From the perspective of magnetization stability, ferromagnetic powder with an average particle size of greater than or equal to 10 nm is desirable.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and in the present specification, the average particle size of the powder, such as ferromagnetic powder, nonmagnetic powder, and various kinds of powder, is the average particle size as obtained by the above method. The average particle size indicated in Examples further below was obtained using a Model H-9000 transmission electron microscope made by Hitachi and KS-400 image analysis software made by Carl Zeiss.

In the present invention and in the present specification, the term "ferromagnetic powder" means an aggregation of multiple ferromagnetic particles. The term "aggregation" is not limited to a state in which the constituent particles are in direct contact, but includes states in which binder, additives, and the like are present between the individual particles. The same applies to other powders, such as the nonmagnetic powder. The term "particles" is also sometimes used to denote powder.

The average particle size can be measured for the powder so long as the powder itself can be measured. It is also possible to conduct measurement with powder extracted from the magnetic tape as sample powder. For example, the method described in Japanese Unexamined Patent Publication (KOKAI) No. 2011-048878, which is expressly incorporated herein by reference in its entirety, paragraph 0015, can be employed as the method for extracting sample powder such as ferromagnetic powder from the magnetic layer for measurement of the particle size.

In the present invention and in the present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Hexagonal ferrite powder is a specific example of desirable ferromagnetic powder. From the perspectives of achieving higher density recording and magnetization stability, the average particle size (average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill ratio) of ferromagnetic powder in the magnetic layer desirably falls within a range of 50 to 90 weight %, preferably within a range of 60 to 90 weight %, of the total weight of the magnetic layer (or the components of the magnetic layer-forming composition other than the solvent (that is, the solid components)). The higher the fill ratio the better from the perspective of improving the recording density.

(Binder)

The magnetic tape of an aspect of the present invention is a particulate magnetic tape with a magnetic layer, a nonmagnetic layer and a backcoat layer described further below, that contain binder. The binder employed can be in the form of polyurethane resin, polyester resin, polyamide resin, vinyl chloride resin, styrene, acrylonitrile, methyl methacrylate, and other copolymerized acrylic resins; nitrocellulose and other cellulose resins; epoxy resin; phenoxy resin; polyvinyl acetal, polyvinyl butyral, and other polyvinyl alkyrals; these resins can be employed singly or two or more resins can be mixed for use. Of these, the polyurethane resins, acrylic resins, and vinyl chloride resins are desirable. These resins can also be employed as binders in the nonmagnetic layer and in the backcoat layer, described further below. Reference can be made to Japanese Unexamined Patent Publication (KOKAI) No. 2010-24113, paragraphs 0028 to 0031, with regard to the binder. Reference can also be made to paragraphs 0014 to 0027 and Examples of Japanese Unexamined Patent Publication (KOKAI) No. 2014-08056, paragraphs 0012 to 0016, 0040 to 0136 and Examples of Japanese Unexamined Patent Publication (KOKAI) No. 2013-065381, with regard to the binder. The contents of the above publications are expressly incorporated herein by reference in their entirety. The quantity of binder, for example, falls within a range of 5.0 weight parts to 50.0 weight parts, desirably within a range of 10.0 weight parts to 30.0 weight parts, per 100.0 weight parts of ferromagnetic powder.

Further, a curing agent can be employed with the above resin. Polyisocyanate is suitable as the curing agent. Reference can be made to Japanese Unexamined Patent Publication (KOKAI) No. 2011-216149, paragraphs 0124 and 0125, for details regarding polyisocyanate. The curing agent can be employed by addition to the coating composition for forming the magnetic layer in a quantity of, for example, 0.0 to 80.0 weight parts, and for improving coating strength, desirably 50.0 to 80.0 weight parts, per 100.0 weight parts of binder.

(Additives)

The magnetic layer contains ferromagnetic powder, lubricant, and binder, and as needed, can contain one or more additives. Examples of additives are nonmagnetic powder (abrasive, protrusion-forming agent), dispersing agents, dispersion adjuvants, antifungal agents, antistatic agents, and oxidation inhibitors. Any quantity of additives can be employed by suitably selecting additives prepared by known methods or commercial products based on the properties desired. For example, reference can be made to Japanese Unexamined Patent Publication (KOKAI) No. 2004-273070, paragraphs 0030 to 0032, regarding abrasives. Protrusion-forming agents in the form of colloidal particles are desirable. From the perspective of availability, inorganic colloidal particles are desirable, inorganic oxide colloidal particles are preferred, and silica colloidal particles (colloidal silica) are particularly desirable. The average particle size of the abrasive and of the protrusion-forming agent is desirably 50 to 200 nm for each. The magnetic layer-forming composition normally contains an organic solvent. Any organic solvents that are commonly employed to manufacture particulate magnetic recording media can be employed in any quantity, either singly or in mixtures of two or more in any ratio.

<Nonmagnetic Layer>

The nonmagnetic layer will be described next. The magnetic tape of an aspect of the present invention has a nonmagnetic layer containing nonmagnetic powder and binder between a nonmagnetic support and the magnetic layer. The nonmagnetic powder that is employed in the nonmagnetic layer can be an organic or inorganic material. Carbon black can also be used. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraph 0146 to 0150, and Japanese Unexamined Patent Publication (KOKAI) No. 2013-049832, paragraphs 0019 to 0020. The contents of the above publications are expressly incorporated herein by reference in their entirety.

As set forth above, the use of carbon black as nonmagnetic powder in the nonmagnetic layer is an example of one way to control the surface lubricant index. The nonmagnetic powder in the nonmagnetic layer can contain, for example, 10.0 weight parts or more of carbon black, or 20.0 weight parts or more of carbon black, per 100.0 weight parts of the total quantity of nonmagnetic powder. Carbon black can also constitute the entire quantity of nonmagnetic powder (that is, the content can be 100.0 weight parts).

The content of nonmagnetic powder in the nonmagnetic layer desirably falls within a range of 50 to 90 weight %, preferably within a range of 60 to 90 weight %, of the total weight of the nonmagnetic layer (or the components of the nonmagnetic layer-forming composition other than the solvent (that is, the solid components)).

Details of the lubricant contained in the nonmagnetic layer are as set forth above.

The binder and the optionally contained curing agent in the nonmagnetic layer are as described for the magnetic layer. The above contents of binder and curing agent in the magnetic layer can also be read as the contents of the binder and of the curing agent relative to the nonmagnetic powder contained in the nonmagnetic layer and applied.

Known techniques can be applied without limitation for other details regarding the nonmagnetic layer.

<Backcoat Layer>

A backcoat layer is present in the magnetic tape of an aspect of the present invention on the opposite surface of the nonmagnetic support from that on which the nonmagnetic layer and magnetic layer are present. The backcoat layer contains at least nonmagnetic powder, lubricant, and optionally contains one or more known additives. Reference can be made to the description given above regarding the nonmagnetic powder in the nonmagnetic layer for the nonmagnetic powder contained in the backcoat layer. Either a combination of carbon black and a nonmagnetic powder other than carbon black, or just carbon black (that is, the nonmagnetic powder of the backcoat layer can consist of carbon black) can be employed as the nonmagnetic powder in the backcoat layer.

The proportion accounted for by carbon black in the nonmagnetic powder of the backcoat layer desirably falls within a range of 50.0 to 100.0 weight parts, preferably within a range of 70.0 to 100.0 weight parts, and more preferably within a range of 90.0 to 100.0 weight parts, per 100.0 weight parts of the total quantity of nonmagnetic powder. It is particularly desirable for the nonmagnetic powder of the backcoat layer to consist of carbon black. The content of nonmagnetic powder in the backcoat layer desirably falls within a range of 50 to 90 weight %, preferably within a range of 60 to 90 weight %, of the total quantity of the backcoat layer (or the components of the backcoat layer-forming composition other than the solvent (that is, the solid components)).

It is desirable to employ nonmagnetic powder with an average particle size of less than or equal to 50 nm to control the presence of indentations on the surface of the magnetic layer set forth above. By contrast, Japanese Unexamined Patent Publication (KOKAI) No. 2004-273070 employs a combination of two types of carbon black of differing average particle size as the nonmagnetic powder in the backcoat layer in Examples (see paragraph 0090 in Japanese Unexamined Patent Publication (KOKAI) No. 2004-273070). Nonmagnetic powder in the backcoat layer in the form of a combination of two types of carbon black of differing average particle size and α-alumina with an average particle size differing from them is employed in Examples of Japanese Unexamined Patent Publication (KOKAI) No. 2006-31805 (see paragraph 0074 in Japanese Unexamined Patent Publication (KOKAI) No. 2006-31805). Among these combinations of nonmagnetic powder that are employed, the nonmagnetic powder with an average particle size exceeding 50 nm tends to form coarse protrusions on the surface of the backcoat layer. When the magnetic tape is rolled up and the surface of the magnetic layer comes into contact with the surface of the backcoat layer, the shape of these coarse protrusions may be transferred to the surface of the magnetic layer, and the number' of indentations specified by condition 1 and the number of indentations specified by condition 2 tend to increase greatly. Accordingly, for the presence of indentations that are present on the surface of the magnetic layer to satisfy conditions 1 and 2, it is desirable to employ nonmagnetic powder with an average particle size of less than or equal to 50 nm. A single type of nonmagnetic powder can be employed, or two or more types can be employed. When employing two or more types (for example, carbon black and a nonmagnetic powder other than carbon black), the average particle size of each is desirably less than or equal to 50 nm. The average particle size of the nonmagnetic powder preferably falls within a range of 10 to 50 nm, more preferably within a range of 10 to 30 nm. In one embodiment, the nonmagnetic powder contained in the backcoat layer consists of carbon black with an average particle size of less than or equal to 50 nm.

To control the presence of indentations on the surface of the magnetic layer, the backcoat layer-forming composition desirably contains a component (dispersing agent) that is capable of enhancing the dispersion of the nonmagnetic powder that is contained in the composition. The backcoat layer-forming composition preferably contains nonmagnetic powder with an average particle size of less than or equal to 50 nm and a component that is capable of enhancing the dispersion of this nonmagnetic powder, and more preferably contains carbon black with an average particle size of less than or equal to 50 nm and a component that is capable of increasing the dispersion of the carbon black.

Amine compounds are an example of such dispersing agents. Examples of specific forms of amine compounds are diamine compounds containing secondary amino groups. Examples of such diamine compounds are the compounds denoted by formula (1) below.

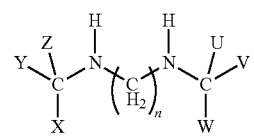

Formula (1)

In formula (1), n denotes an integer falling within a range of 2 to 4. From the perspective of solubility, 2 or 3 is desirable, and 2 is preferred.

In formula (1), the substituent denoted by each of U, V, X, and Y is a substituent (also referred to hereinafter as a "carbon-containing substituent") that contains at least one carbon atom and binds, through the carbon atom, to a carbon atom to which the substituent substitutes. That is, in formula (1), the carbon atom bonding with the nitrogen atom in the secondary amino group is at least a secondary carbon atom (there are at least two adjacent carbon atoms). In formula (1), the plurality of carbon-containing substituents that are contained can be of identical or different structures. The carbon-containing substituents can include, by way of example, secondary amine structures, tertiary amine structures, ether structures, hydroxyl groups, and vinyl structures. They can also include cyclic structures such as five-membered and six-membered rings.

Examples of carbon-containing substituents are linear and branched saturated and unsaturated hydrocarbon groups. The above hydrocarbon groups can have substituents. Examples of such substituents are alkyl groups (such as alkyl groups having 1 to 6 carbon atoms), hydroxyl groups, alkoxyl groups (such as alkoxyl groups having 1 to 6 carbon atoms), halogen atoms (such as fluorine, chlorine, and bromine atoms), and aryl groups (such as phenyl groups). The "number of carbon atoms" when a substituent is present means the number of carbon atoms of the portion without the substituent.

From the perspective of enhancing dispersion, the hydrocarbon group is desirably an alkyl group; for example, a linear or branched alkyl group having 1 to 18 carbon atoms. The alkyl group can be substituted or unsubstituted.

The number of carbon atoms of the alkyl group desirably falls within a range of 1 to 10, preferably within a range of 1 to 8, more preferably within a range of 1 to 5, and still more preferably, within a range of 1 to 3. Even more preferably, the carbon-containing substituent is a methyl group or an ethyl group, preferably a methyl group.

In formula (1), each of W and Z independently denotes a hydrogen atom or a substituent. Each of W and Z can contain a secondary amine structure, tertiary amine structure, ether structure, hydroxyl group, vinyl structures, or the like, and can contain a cyclic structure such as a five-membered or six-membered ring. At least either W or Z is desirably a substituent (carbon-containing substituent) that contains at least one carbon atom and binds, through the carbon atom, to a carbon atom to which the substituent substitutes. It is preferable for both W and Z to be carbon-containing substituents, that is, for the carbon atom bonding to the nitrogen atom in the secondary amino group of formula (1) to be a tertiary carbon atom (with three adjacent carbon atoms being present). Details regarding the carbon-containing substituents denoted by W and Z are as set forth for the carbon-containing substituents denoted by U, V, X, and Y above.

The above diamine compound can be synthesized by known methods and are available as commercial products. The above diamine compound is desirably employed in a proportion of 1.0 to 50.0 weight parts, preferably in a proportion of 1.0 to 20.0 weight parts, per 100.0 weight parts of carbon black.

Organic tertiary amines are a further example of amine compounds. Reference can be made to Japanese Unexamined Patent Publication (KOKAI) No. 2013-049832, paragraphs 0011 to 0018 and 0021 with regard to organic tertiary amines. Reference can also be made to paragraphs 0022 to 0024 and 0027 of the same for composition formulas and the like for increasing the dispersion of carbon black with organic tertiary amines.

The above description of the magnetic layer and nonmagnetic layer as well as known techniques can be applied to other details of the formula of the backcoat layer-forming composition (such as the types and quantities binder, various additives, and solvents that are added).

<Nonmagnetic Support>

Details of the nonmagnetic support will be described next. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, heat treatment and the like in advance.

<Thickness of the Various Layers and the Nonmagnetic Support>

The thickness of the nonmagnetic support is desirably 3 μm to 80 μm, preferably 3 μm to 50 μm, and more preferably, 3 μm to 10 μm.

The thickness of the magnetic layer can be optimized based on the saturation magnetization level of the magnetic head employed, the length of the head gap, and the bandwidth of the recording signal. It is desirably 5 to 200 nm, preferably 5 to 100 nm, and further preferably 10 to 100 nm, to achieve higher recording densities. The magnetic layer includes at least one layer, and can be divided into two or more layers having differing magnetic properties. A configuration relating to known multilayer magnetic layers can be applied.

The thickness of the nonmagnetic layer desirably falls within a range of 5 nm (0.005 μm) to 3 μm, preferably within a range of 5 nm to 1.5 μm, more preferably within a range of 30 nm to 1.5 μm, and still more preferably, within a range of 50 nm to 1.5 μm. It is desirable to reduce the overall thickness of the magnetic tape to increase the recording capacity per magnetic tape cartridge, for magnetic tapes. A thin nonmagnetic layer is desirable in that it facilitates a reduction in overall thickness.

Reducing the thickness of the magnetic layer and nonmagnetic layer tends to reduce the amount of lubricant that is supplied from within the magnetic layer and from the nonmagnetic layer to the surface of the magnetic layer. In the magnetic tape of an aspect of the present invention, the present inventor presumes that the fact that lubricant is supplied to the surface of the magnetic layer, on which indentations are present in a manner satisfying conditions 1 and 2, from the backcoat layer even with repeated running can contribute to enhancing running durability.

The nonmagnetic layer of the magnetic tape in the present invention will include an essentially nonmagnetic layer containing small quantities of ferromagnetic powder, either as impurities or by design, for example, along with nonmagnetic powder. In the present invention and in the present specification, the term "essentially nonmagnetic layer" means a layer in which the residual magnetic flux density is less than or equal to 10 mT, in which the coercive force is less than or equal to 7.96 kA/m (100 Oe), or in which the residual magnetic flux density is less than or equal to 10 mT and the coercive force is less than or equal to 7.96 kA/m (100 Oe). The nonmagnetic layer desirably has neither residual magnetic flux density nor coercive force.

The thickness of the backcoat layer is desirably less than or equal to 0.90 μm, preferably 0.10 μm to 0.70 μm.

The thickness of the various layers and nonmagnetic support of the magnetic tape can be determined by known methods of measuring film thickness. For example, a cross-section in the direction of thickness of the magnetic tape is exposed by a known method such as an ion beam or a microtome, and the exposed cross-section is observed by a scanning electron microscope. The various thicknesses can be determined as the thickness in one spot, or the arithmetic average of the thickness determined in two or more spots—for example, two spots—in the direction of thickness. The thicknesses of the various layers can also be calculated from the manufacturing conditions as design thicknesses.

<Process of Manufacturing the Magnetic Tape>

The magnetic tape of an aspect of the present invention is a particulate magnetic tape. It can be manufactured using coating compositions for forming the various layers, such as a magnetic layer, a nonmagnetic layer, and a backcoat layer. Specific embodiments of the process of manufacturing a magnetic tape will be described below. However, the magnetic tape of an aspect of the present invention is not limited to magnetic tapes manufactured by a manufacturing process of the embodiment set forth below.

(Compositions for Forming Various Layers and Preparation Method Thereof)

The composition for forming the magnetic layer normally contains solvent in addition to the various components set forth above. Examples of the solvent are the organic solvents generally employed to manufacture particulate magnetic tapes. The content of solvent in the composition for forming the magnetic layer falls, for example, within a range of 100.0 weight parts to 800.0 weight parts, desirably within a range of 200.0 weight parts to 800.0 weight parts, per 100.0 weight parts of ferromagnetic powder.

The process of preparing the composition for forming each of the magnetic layer, the nonmagnetic layer, and the backcoat layer normally includes a kneading step, a dispersing step, and mixing steps provided as needed before and after these steps. Each individual step can be divided into two or more steps. All of the starting materials, such as the ferromagnetic powder, binder, nonmagnetic powder, carbon black, various additives, and solvent, can be added at the outset or part way through any step. The individual starting materials can be divided up and added in two or more steps. For example, for the coating composition for forming the magnetic layer, a dispersion (magnetic liquid) containing ferromagnetic powder, a dispersion (abrasive liquid) containing abrasive, and a dispersion (protrusion-forming agent liquid) containing a protrusion-forming agent are desirably prepared as separate dispersions and then simultaneously or sequentially mixed with other components such as lubricants to prepare the composition for forming the magnetic layer. Part or all of the lubricants, curing agent, and solvent can be added to the mixtures of the magnetic liquid, abrasive liquid, and protrusion-forming agent liquid. Additionally, reference can be made to Japanese Unexamined Patent Publication (KOKAI) No. 2010-231843, paragraph 0065, regarding preparation of coating compositions of various layers. The content of the above publication is expressly incorporated herein by reference in its entirety.

The nonmagnetic layer can be formed by directly coating, for example, the composition for forming the nonmagnetic layer on the surface of a nonmagnetic support. The composition for forming the nonmagnetic layer normally contains solvent in addition to the various components set forth above. Examples of the solvent are the organic solvents that are commonly employed in the manufacturing of particulate magnetic tapes. Additionally, reference can be made to the above description of the coating composition for forming the magnetic layer for details about how to prepare the coating composition for forming the nonmagnetic layer.

Reference can be made to the above description regarding the coating composition for forming the magnetic layer with regard to details on preparation of the coating composition for forming the backcoat layer.

(Coating Process)

The magnetic layer can be formed by multilayer coating the coating composition for forming the magnetic layer and the coating composition for forming the nonmagnetic layer either sequentially or simultaneously. The backcoat layer can be formed by coating the composition for forming the backcoat layer on the opposite surface of the nonmagnetic support from that on which the magnetic layer and nonmagnetic layer are formed.

Reference can be made to Japanese Unexamined Patent Publication (KOKAI) No. 2010-231843, paragraph 0066, for details on coatings to form the various layers.

(Other Steps)

Reference can be made to Japanese Unexamined Patent Publication (KOKAI) No. 2010-231843, paragraphs 0067 to 0070, with regard to various other steps in manufacturing a magnetic tape.

The magnetic tape of an aspect of the present invention set forth above can afford good electromagnetic characteristics as well as good running durability (little shaving of the surface of the magnetic layer with repeated running).

[Magnetic Signal Reproducing Device]

An aspect of the present invention relates to a magnetic signal reproducing device containing the above magnetic tape and a magnetic reproduction head.

So long as the magnetic tape of an aspect of the present invention set forth above is present, known techniques can be applied without limitation to other details of the above magnetic signal producing device.

In a desirable embodiment, a magnetic signal that has been recorded at a linear recording density of greater than or equal to 200 kfci on the above magnetic tape can be reproduced by a magnetic reproduction head in the above magnetic signal reproducing device. The magnetic tape of an aspect of the present invention can be suitably employed to record and reproduce magnetic signals at high linear recording densities of greater than or equal to 200 kfci. By way of example, the linear recording density is less than or equal to 400 kfci, but can exceed 400 kfci.

With regard to recording and reproducing magnetic signals, indentations that are present on the surface of the magnetic layer increase the spacing between the magnetic head/magnetic tape during recording and reproduction. In this regard, the following relation exists for the output drop Ls due to the increased spacing. In the equation below, d=spacing between magnetic head/magnetic tape (nm) and λ=recording wavelength (nm).

$$Ls(dB)=54.6(d/\lambda)$$

As will be understood from the above relation, the shorter the recording wavelength becomes (the shorter the recording wavelength), the more the drop in output can be inhibited by reducing the spacing. Since shortening the recording wavelength is synonymous with increasing the recording density, the greater the recording density, the more the drop in output can be inhibited by reducing the spacing. In this regard, the present inventor assumes that indentations of the depth specified by condition 1, that are shallower than the indentations specified by condition 2, tends not to impart a major drop in output due to spacing in a high density recording region. By contrast, the present inventor assumes that increasing the number of indentations of the depth specified by condition 2 may cause a drop in output due to spacing in a high density recording region. The present inventor further presumes that indentations of the depth specified by condition 1 can play the role of reservoirs of lubricant, replenishing the lubricant that becomes depleted on the surface of the magnetic layer with repeated running as set forth above. Thus, the present inventor presumes that causing indentations that satisfy conditions 1 and 2 as set forth above to be present on the surface of the magnetic layer can achieve both electromagnetic characteristics and running durability even in regions of high-density recording.

Reference can be made to Japanese Unexamined Patent Publication (KOKAI) No. 2010-231843, paragraphs 0072 and 0073, for details regarding the structure and the like of the magnetic signal reproducing device.

EXAMPLES

The present invention will be described in detail below based on Examples. However, the present invention is not limited to embodiments shown in Examples. The terms "parts" and "percent" given in Examples are weight parts and weight percent unless otherwise stated. Unless specifically stated otherwise, the following operations were carried out at room temperature. Room temperature was a temperature ranging from 20 to 25° C.

In Examples and Comparative Examples, the thickness of the various layers is the design thickness calculated from the manufacturing conditions. The weight average molecular weight of the binder given further below is a value measured under the following measurement conditions.

Gel permeation chromatography (GPC) device: HLC-8120 (made by Tosoh Corp.)
Column: TSK gel Multipore HXL-M (made by Tosoh Corp., 7.8 mm inner diameter (ID)×30.0 cm)
Eluent: Tetrahydrofuran (THF)

Example 1

(1) Formula of Magnetic Layer-Forming Composition (Magnetic liquid)

| | |
|---|---|
| Ferromagnetic hexagonal barium ferrite powder:<br>Average particle size (average plate diameter): 35 nm | 100.0 parts |
| $SO_3Na$ group-containing polyurethane resin:<br>(weight average molecular weight: 70,000, $SO_3Na$ groups: 0.4 meq/g) | 14.0 parts |
| Cyclohexanone: | 150 parts |
| Methyl ethyl ketone: | 150 parts |

(Abrasive liquid A)

| | |
|---|---|
| Alumina abrasive (average particle size: 100 nm): | 3.0 parts |
| Sulfonic acid group-containing polyurethane resin:<br>(weight average molecular weight: 70,000, $SO_3Na$ groups: 0.3 meq/g) | 0.3 part |
| Cyclohexanone: | 26.7 parts |

(Abrasive liquid B)

| | |
|---|---|
| Diamond abrasive (average particle size: 100 nm): | 1.0 part |
| Sulfonic acid group-containing polyurethane resin:<br>(weight average molecular weight: 70,000, $SO_3Na$ groups: 0.3 meq/g) | 0.1 part |
| Cyclohexanone: | 26.7 parts |

(Silica sol)

| | |
|---|---|
| Colloidal silica (average particle diameter 100 nm): | 0.2 part |
| Methyl ethyl ketone: | 1.4 parts |

(Other components)

| | |
|---|---|
| Stearic acid: | 2.0 parts |
| Butyl stearate: | 10.0 parts |
| Polyisocyanate (Coronate made by Nippon Polyurethane Industry Co., Ltd.): | 2.5 parts |

(Solvents added to finish)

| | |
|---|---|
| Cyclohexanone: | 200.0 parts |
| Methyl ethyl ketone: | 200.0 parts |

(2) Formula of Nonmagnetic Layer-Forming Composition

| | |
|---|---|
| Nonmagnetic inorganic powder α-iron oxide:<br>Average major axis length: 10 nm<br>Average acicular ratio: 1.9<br>Brunauer-Emmett-Teller (BET) specific surface area: 75 m²/g | 100.0 parts |
| Carbon black:<br>Average particle size: 20 nm | 25.0 parts |
| $SO_3Na$ group-containing polyurethane resin:<br>(weight average molecular weight: 70,000, $SO_3Na$ groups: 0.2 meq/g) | 18 parts |
| Stearic acid: | 1.0 part |
| Cyclohexanone: | 300.0 parts |
| Methyl ethyl ketone: | 300.0 parts |

(3) Formula of Backcoat Layer-Forming Composition

| | |
|---|---|
| Carbon black:<br>BP-800 made by Cabot Corp., average particle size: 17 nm | 100.0 parts |
| $SO_3Na$ group-containing polyurethane resin ($SO_3Na$ groups: 70 eq/ton): | 20.0 parts |
| $OSO_3K$ group-containing vinyl chloride resin ($OSO_3K$ groups: 70 eq/ton): | 30.0 parts |
| Di-tert-butylethylene diamine: | 2.0 parts |
| Cyclohexanone: | 140.0 parts |
| Methyl ethyl ketone: | 170.0 parts |
| Stearic acid: | 2.0 parts |
| Butyl stearate: | 2.0 parts |
| Amide stearate: | 0.1 part |

(4) Fabrication of Magnetic Tape

The above magnetic liquid was dispersed for 24 hours with a batch-type vertical sand mill. Zirconia beads 0.5 mm in diameter were employed as dispersion beads. Abrasive liquids A and B were dispersed for 24 hours in a batch-type ultrasonic apparatus (20 kHz, 300 W). These dispersions were mixed with the other components (silica sol, other components, and solvents added to finish), and then dispersion processed for 30 minutes in a batch-type ultrasonic apparatus (20 kHz, 300 W). Subsequently, filtering was conducted with a filter having an average pore diameter of 0.5 μm to prepare a magnetic layer-forming composition.

For the nonmagnetic layer-forming composition, the various components were dispersed for 24 hours with a batch-type vertical sand mill. Zirconia beads 0.1 mm in diameter were employed as dispersion beads. The dispersion obtained was filtered with a filter having an average pore diameter of 0.5 μm to prepare a nonmagnetic layer-forming composition.

For the backcoat layer-forming composition, the various components were kneaded in a continuous kneader and then dispersed in a sand mill. To the dispersion obtained were added 40.0 parts of polyisocyanate (Coronate L made by Nippon Polyurethane Industry Co., Ltd.) and 1,000.0 parts of methyl ethyl ketone. The mixture was then filtered with a filter having an average pore diameter of 1 μm to prepare a backcoat layer-forming composition.

Subsequently, the nonmagnetic layer-coating composition was coated and dried to a dry thickness of 100 nm on one surface of a polyethylene naphthalate support 5 μm in thickness. The magnetic layer-forming composition was then coated thereover in a quantity calculated to yield a dry thickness of 70 nm. While the magnetic layer-forming composition was still wet, a magnetic field with a magnetic strength of 0.6 T was applied in a direction perpendicular to the coating surface to conduct perpendicular orientation processing, after which drying was conducted. The backcoat layer-forming composition was then coated and dried to a dry thickness of 0.4 μm on the opposite surface of the support.

Surface-smoothing processing was conducted at a temperature of 100° C., a linear pressure of 300 kg/cm, and a speed of 100 m/minute with a calender comprised solely of metal rolls. A heat treatment was then conducted for 36 hours in an environment with an atmospheric temperature of 70° C. Following the heat treatment, the product was slit to a width of ½ inch (0.0127 meter) to obtain a magnetic tape.

Examples 2 to 7, Comparative Examples 1 to 6

With the exceptions that the magnetic layer-forming composition and backcoat layer-forming composition having the formulas given in Table 1 were employed, magnetic tapes were fabricated in the same manner as in Example 1. In Table 1, BaFe denotes ferromagnetic hexagonal barium ferrite powder. MP denotes ferromagnetic metal powder. The average particle size indicated in Table 1 was the average plate diameter for BaFe and the average major axis length for MP.

[Evaluation Methods]

1. Surface Lubricant Index

The surface lubricant index was measured on the surface of the magnetic layer of each of the magnetic tapes of Examples and Comparative Examples by the method set forth above. The lubricant removal processing of Sample B was conducted by the following method.

Sample B (10 mm×30 mm) was immersed for 30 minutes at room temperature in n-hexane. Next, Sample B was removed from the n-hexane and charged to a test tube. A 10 mL quantity of n-hexane and a derivatizing reagent in the form of 0.3 mL of TMSI-H (a mixture of hexamethyl disilazane (HMDS):trimethyl chlorosilane (TMCS):pyridine) made by GL Science Corp. were added. A heat derivatization reaction was conducted for 1 hour at a liquid temperature of 60° C. Sample B was removed from the test tube, washed with ethanol, and allowed to dry naturally.

2. Presence of Indentations on the Surface of the Magnetic Layer

The number of indentations greater than or equal to 5 nm and less than 10 nm in depth and the number of indentations greater than or equal to 10 nm in depth that were present on the surface of the magnetic layer of each of the magnetic tapes of Examples and Comparative Examples were determined.

3. Electromagnetic Characteristics (SNR)

The various magnetic tapes were run at a speed of 3 m/sec in a linear tester and the head was pressed against the surface of the magnetic layer of the magnetic tape to conduct recording and reproduction. Recording was conducted with a metal-in-gap (MIG) head (head gap length=0.2 μm, track width 14 μm) with a saturation magnetization of 1.4 T. The recording current was set to the optimal recording current of each tape. An anisotropic magnetoresistive (MR) head (A-MR) with an element thickness of 25 nm and a shield spacing of 0.2 μm (track width 7 μm) was employed as the reproduction head. In this evaluation system, a 300 kfci magnetic signal was recorded. The carrier output of a spectral analyzer (U3741 made by Advantest Corp.) was then adopted as the output (C) and the noise level at −2 MHz was adopted as the noise (N) to calculate the SNR as C/N. The SNR is given relative to the value of Comparative Example 1.

Since the magnetic tape of Comparative Example 4 had a low surface lubricant index and a high coefficient of friction during sliding of the surface of the magnetic layer and the head, the magnetic layer was damaged during the evaluation of electromagnetic characteristics, precluding SNR measurement.

4. Running Durability (Evaluation of Shaving of the Surface of the Magnetic Layer with Repeated Running)

The running durability of each of the magnetic tapes of Examples and Comparative Examples was evaluated with the linear tester set forth in 3. above.

A tape 100 m in length was run 1,000 passes, at which point the degree of shaving of the surface of the magnetic layer was observed by an optical microscope. The degree of shaving was evaluated as follows:

A: No sliding marks observed;
B: Faint sliding marks present, but not amounting to shaving of the surface of the magnetic layer;
C: Shaving of the surface of the magnetic layer; and
D: Shaving of the surface of the magnetic layer (more severely than in C) with the presence of numerous spots in which the magnetic layer was missing or the surface of the magnetic layer had separated.

5. Surface Lubricant Index Following Repeated Running

The surface lubricant index was measured on the surface of the magnetic layer of each magnetic tape following the evaluation of 4. The method described in 1. above was used to conduct lubricant removal processing on Sample B.

The results of the above are given in Table 1.

TABLE 1

| | Magnetic layer-forming composition | | | Backcoat layer-forming composition | | |
|---|---|---|---|---|---|---|
| | Ferromagnetic powder | | Lubricant | | | Amide |
| | Type | Average particle size [nm] | Stearic acid [Parts] | Butyl stearate [Parts] | Carbon black | Stearic acid [Parts] | stearate [Parts] |
| Ex. 1 | BF | 35 | 2.0 | 10.0 | Average particle size: 17 nm (100 parts) | 2.0 | 0.1 |
| Ex. 2 | BF | 35 | 2.0 | 25.0 | Average particle size: 17 nm (100 parts) | 2.0 | 0.1 |
| Ex. 3 | BF | 35 | 2.0 | 10.0 | Average particle size: 17 nm (100 parts) | 2.0 | 0.1 |
| Ex. 4 | BF | 35 | 2.0 | 10.0 | Average particle size: 17 nm (100 parts) | 2.0 | 0.1 |
| Ex. 5 | BF | 35 | 2.0 | 2.0 | Average particle size: 17 nm (100 parts) | 2.0 | 0.1 |
| Ex. 7 | BF | 35 | 2.0 | 10.0 | Average particle size: 13 nm (100 parts) | 2.0 | 0.1 |
| Comp. Ex. 1 | BF | 35 | 2.0 | 10.0 | Average particle size: 17 nm (100 parts) Average particle size: 270 nm (10 parts) | 2.0 | 0.1 |
| Comp. Ex. 3 | BF | 35 | 2.0 | 40.0 | Average particle size: 17 nm (100 parts) | 2.0 | 0.1 |
| Comp. Ex. 4 | BF | 35 | 2.0 | 10.0 | Average particle size: 17 nm (100 parts) | 0 | 0 |
| Comp. Ex. 5 | BF | 35 | 2.0 | 10.0 | Not contained | 2.0 | 0.1 |
| Comp. Ex. 6 | BF | 35 | 2.0 | 40.0 | Average particle size: 17 nm (100 parts) | 0 | 0 |
| Ex. 6 | MP | 60 | 2.0 | 1.6 | Average particle size: 17 nm (100 parts) | 2.0 | 0.1 |
| Comp. Ex. 2 | MP | 60 | 2.0 | 1.6 | Average particle size: 17 nm (100 parts) Average particle size: 100 nm (10 parts) | 0 | 0 |

TABLE 1-continued

| | Backcoat layer-forming composition Butyl stearate [Parts] | Surface lubricant index (value measured for magnetic tape prior to running) | Number of indentations on the surface of the magnetic layer/ (350 μm × 260 μm) | | Electromagnetic characteristics SNR [dB] | After 1000-pass running | |
|---|---|---|---|---|---|---|---|
| | | | greater than or equal to 5 nm and less than 10 nm in depth | greater than or equal to 10 nm in depth | | Running durability (shaving of the surface of the magnetic layer) | Surface lubricant index |
| Ex. 1 | 3.0 | 2.00 | 220 | 35 | 2.5 | B | 2.00 |
| Ex. 2 | 3.0 | 3.80 | 980 | 92 | 1.0 | B | 2.30 |
| Ex. 3 | 10.0 | 2.80 | 320 | 50 | 2.0 | A | 2.80 |
| Ex. 4 | 20.0 | 3.50 | 900 | 85 | 1.3 | A | 3.50 |
| Ex. 5 | 1.0 | 1.30 | 95 | 15 | 2.8 | B | 1.20 |
| Ex. 7 | 3.0 | 2.00 | 30 | 10 | 3.0 | B | 2.00 |
| Comp. Ex. 1 | 3.0 | 2.00 | 2030 | 560 | 0.0 | C | 0.80 |
| Comp. Ex. 3 | 40.0 | 4.50 | 3200 | 120 | −2.4 | C | 5.20 |
| Comp. Ex. 4 | 0 | 0.80 | 200 | 30 | Measurement was precluded. | D | 0.30 |
| Comp. Ex. 5 | 3.0 | 1.80 | 0 | 0 | 3.0 | C | 0.50 |
| Comp. Ex. 6 | 0 | 1.20 | 230 | 10 | 2.5 | C | 0.50 |
| Ex. 6 | 3.0 | 3.80 | 880 | 80 | −3.0 | B | 2.56 |
| Comp. Ex. 2 | 0 | 2.56 | 1230 | 340 | −3.2 | C | 0.50 |

From the results in Table 1, it can be confirmed that, in the magnetic tapes of Examples, good electromagnetic characteristics could be achieved and shaving of the surface of the magnetic layer with repeated running could be inhibited.

An aspect of the present invention is useful in the field of manufacturing magnetic tapes for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape, which comprises:
   a nonmagnetic layer comprising nonmagnetic powder and binder on one surface of a nonmagnetic support;
   a magnetic layer comprising ferromagnetic powder and binder on a surface of the nonmagnetic layer; and
   a backcoat layer comprising nonmagnetic powder and binder on an opposite surface of the nonmagnetic support from the surface on which the nonmagnetic layer and magnetic layer are present;
   with one or both of the magnetic layer and nonmagnetic layer comprising at least one type of lubricant;
   with the backcoat layer comprising at least one type of lubricant;
   with a surface lubricant index as measured on a surface of the magnetic layer ranging from 1.00 to 4.00; and
   with indentations being present on the surface of the magnetic layer and a state of a presence of indentations on the surface of the magnetic layer satisfying condition 1 and condition 2:
   condition 1: a number of indentations greater than or equal to 5 nm and less than 10 nm in depth of 30 to 1,000 per 350 μm×260 μm area; and
   condition 2: a number of indentations greater than or equal to 10 nm in depth of 10 to 100 per 350 μm×260 μm area.

2. The magnetic tape according to claim 1, wherein the nonmagnetic powder contained in the backcoat layer is carbon black with an average particle size of less than or equal to 50 nm.

3. The magnetic tape according to claim 2, wherein the backcoat layer further comprises an amine compound.

4. The magnetic tape according to claim 1, wherein the lubricant contained in either one or both of the magnetic layer and nonmagnetic layer is at least one lubricant selected from the group consisting of a fatty acid, a fatty acid ester, and a fatty acid amide.

5. The magnetic tape according to claim 1, wherein the lubricant contained in the backcoat layer is at least one lubricant selected from the group consisting of a fatty acid, a fatty acid ester, and a fatty acid amide.

6. The magnetic tape according to claim 1, wherein a thickness of the magnetic layer ranges from 5 nm to 200 nm.

7. The magnetic tape according to claim 1,
wherein a thickness of the nonmagnetic layer ranges from 5 nm to 3 μm.

8. The magnetic tape according to claim 1,
wherein the backcoat layer comprises 1.0 weight part to 40.0 weight parts of the lubricant per 100.0 weight parts of the nonmagnetic powder.

9. The magnetic tape according to claim 1,
wherein the ferromagnetic powder is ferromagnetic powder selected from the group consisting of ferromagnetic hexagonal ferrite powder and ferromagnetic metal powder.

10. A magnetic signal reproducing device,
which comprises a magnetic tape and a magnetic reproduction head,
wherein the magnetic tape comprises:
a nonmagnetic layer comprising nonmagnetic powder and binder on one surface of a nonmagnetic support;
a magnetic layer comprising ferromagnetic powder and binder on a surface of the nonmagnetic layer; and
a backcoat layer comprising nonmagnetic powder and binder on an opposite surface of the nonmagnetic support from the surface on which the nonmagnetic layer and magnetic layer are present;
with one or both of the magnetic layer and nonmagnetic layer comprising at least one type of lubricant;
with the backcoat layer comprising at least one type of lubricant;
with a surface lubricant index as measured on the surface of the magnetic layer falling within a range of 1.00 to 4.00; and
with indentations being present on the surface of the magnetic layer and a state of a presence of indentations on the surface of the magnetic layer satisfying condition 1 and condition 2:
condition 1: a number of indentations greater than or equal to 5 nm and less than 10 nm in depth of 30 to 1,000 per 350 μm×260 μm area; and
condition 2: a number of indentations greater than or equal to 10 nm in depth of 10 to 100 per 350 μm×260 μm area.

11. The magnetic signal reproducing device according to claim 10,
which reproduces a magnetic signal that has been recorded at a linear recording density of greater than or equal to 200 kfci on the magnetic tape by the magnetic reproduction head.

12. The magnetic signal reproducing device according to claim 10,
wherein the nonmagnetic powder contained in the backcoat layer is carbon black with an average particle size of less than or equal to 50 nm.

13. The magnetic signal reproducing device according to claim 12,
wherein the backcoat layer further comprises an amine compound.

14. The magnetic signal reproducing device according to claim 10,
wherein the lubricant contained in either one or both of the magnetic layer and nonmagnetic layer is at least one lubricant selected from the group consisting of a fatty acid, a fatty acid ester, and a fatty acid amide.

15. The magnetic signal reproducing device according to claim 10,
wherein the lubricant contained in the backcoat layer is at least one lubricant selected from the group consisting of a fatty acid, a fatty acid ester, and a fatty acid amide.

16. The magnetic signal reproducing device according to claim 10,
wherein a thickness of the magnetic layer ranges from 5 nm to 200 nm.

17. The magnetic signal reproducing device according to claim 10,
wherein a thickness of the nonmagnetic layer ranges from 5 nm to 3 μm.

18. The magnetic signal reproducing device according to claim 10,
wherein the backcoat layer comprises 1.0 weight part to 40.0 weight parts of the lubricant per 100.0 weight parts of the nonmagnetic powder.

19. The magnetic signal reproducing device according to claim 10,
wherein the ferromagnetic powder is ferromagnetic powder selected from the group consisting of ferromagnetic hexagonal ferrite powder and ferromagnetic metal powder.

* * * * *